United States Patent
Madabhushi et al.

(10) Patent No.: US 11,361,437 B2
(45) Date of Patent: Jun. 14, 2022

(54) ANALYSIS OF PROSTATE GLANDS USING THREE-DIMENSIONAL (3D) MORPHOLOGY FEATURES OF PROSTATE FROM 3D PATHOLOGY IMAGES

(71) Applicants: Case Western Reserve University, Cleveland, OH (US); University of Washington, Seattle, WA (US)

(72) Inventors: Anant Madabhushi, Shaker Heights, OH (US); Can Koyuncu, Cleveland, OH (US); Cheng Lu, Cleveland, OH (US); Nicholas P. Reder, Seattle, WA (US); Jonathan Teng-Chieh Liu, Seattle, WA (US)

(73) Assignee: Case Western Reserve University, Cleveland, OH (US)

( * ) Notice: Subject to any disclaimer, the term of this patent is extended or adjusted under 35 U.S.C. 154(b) by 37 days.

(21) Appl. No.: 16/901,629

(22) Filed: Jun. 15, 2020

(65) Prior Publication Data

US 2021/0049759 A1 Feb. 18, 2021

Related U.S. Application Data

(60) Provisional application No. 62/887,106, filed on Aug. 15, 2019.

(51) Int. Cl.
*G06K 9/00* (2022.01)
*G06T 7/00* (2017.01)
*G06T 7/41* (2017.01)

(52) U.S. Cl.
CPC .............. *G06T 7/0012* (2013.01); *G06T 7/41* (2017.01); *G06T 2207/10081* (2013.01);
(Continued)

(58) Field of Classification Search
CPC ......... G06T 7/0012; G06T 2207/20081; G06T 2207/20084; G06T 2207/30081;
(Continued)

(56) References Cited

U.S. PATENT DOCUMENTS

2009/0161928 A1* 6/2009 Khamene .............. G06T 7/0012
382/128
2011/0040169 A1* 2/2011 Kamen .................... G06T 7/33
600/411
(Continued)

*Primary Examiner* — Atiba O Fitzpatrick
(74) *Attorney, Agent, or Firm* — Eschweiler & Potashnik, LLC

(57) ABSTRACT

Embodiments discussed herein facilitate determining a diagnosis and/or prognosis for prostate cancer based at least in part on three-dimensional (3D) pathomic feature(s). One example embodiment comprises a computer-readable medium storing computer-executable instructions that, when executed, cause a processor to perform operations, comprising: accessing a three-dimensional (3D) optical image volume comprising a prostate gland of a patient; segmenting the prostate gland of the 3D optical image volume; extracting one or more features from the segmented prostate gland, wherein the one or more features comprise at least one 3D pathomic feature; and generating, via a model based at least on the one or more features, one or more of the following based at least on the extracted one or more features: a classification of the prostate gland as one of benign or malignant, a Gleason score associated with the prostate gland, or a prognosis for the patient.

27 Claims, 11 Drawing Sheets

(52) U.S. Cl.
CPC ............... *G06T 2207/10088* (2013.01); *G06T 2207/10116* (2013.01); *G06T 2207/10132* (2013.01); *G06T 2207/20081* (2013.01); *G06T 2207/30081* (2013.01); *G06T 2207/30096* (2013.01)

(58) Field of Classification Search
CPC . G06T 2207/30096; G06T 2207/10056; G06T 2207/10061; G06T 7/41; G06T 2207/10081; G06T 2207/10088; G06T 2207/10116; G06T 2207/10132; G06K 9/00127; G06K 9/00134; G06K 2209/403
See application file for complete search history.

(56) References Cited

U.S. PATENT DOCUMENTS

| | | | |
|---|---|---|---|
| 2012/0184560 A1* | 7/2012 | Wong | A61P 35/00 |
| | | | 514/252.19 |
| 2013/0183707 A1* | 7/2013 | Mangoubi | G16B 40/00 |
| | | | 435/29 |
| 2014/0233826 A1* | 8/2014 | Agaian | G06K 9/46 |
| | | | 382/133 |
| 2020/0057069 A1* | 2/2020 | Tajbakhsh | G01N 33/57434 |
| 2020/0250817 A1* | 8/2020 | Leng | G16H 50/20 |
| 2021/0231567 A1* | 7/2021 | Lemke | B01L 3/502715 |

* cited by examiner

ANALYSIS OF PROSTATE GLANDS USING THREE-DIMENSIONAL (3D) MORPHOLOGY FEATURES OF PROSTATE FROM 3D PATHOLOGY IMAGES

CROSS REFERENCE TO RELATED APPLICATIONS

This application claims the benefit of U.S. Provisional Patent Application No. 62/887,106 filed Aug. 15, 2019, entitled "SEPARATING BENIGN AND MALIGNANT PROSTATE GLANDS USING THREE DIMENSIONAL (3D) MORPHOLOGY FEATURES OF PROSTATE FROM 3D PATHOLOGY IMAGES", the contents of which are herein incorporated by reference in their entirety.

FEDERAL FUNDING NOTICE

This invention was made with government support under the grant(s) CA199374, CA202752, CA208236, CA216579, CA2205811, CA239055, CA240681, EB028736, and RR12463, awarded by the National Institutes of Health; the grant(s) W81XWH-15-1-0558, W81XWH-16-1-0329, W81XWH-18-1-0440, W81XWH-18-10358, W81XWH-18-PC180686, and W81XWH-19-1-0668 awarded by the Department of Defense; the grant(s) CON501692 awarded by the National Science Foundation; and the grant(s) IBX004121A awarded by the United States Department of Veterans Affairs. The government has certain rights in the invention.

BACKGROUND

Prostate cancer is one of the most common cancer types among men, with more than 1 million new cases occurring worldwide annually. The prostate cancer management pipeline generally starts with a blood test screening. The blood from a patient is taken for the evaluation of the prostate-specific antigen (PSA) level. However, this is not generally sufficient for the diagnosis of cancer, since the high level of PSA might occur in non-cancerous patients because of other factors such as tissue inflammation. For a more accurate diagnosis, biopsy samples are taken from the patient's body for detailed examination.

Cancer aggressiveness for the patient has been determined to select the optimal cancer treatment type. Determining cancer aggressiveness plays an important role in patient prognosis, since the wrong treatment may result in severe effects on the patient body. Several factors are taken into consideration in cancer aggressiveness, such as metastasis, PSA level, and Gleason grade. Gleason grade is a well-known metric, grading how much cancer from a biopsy looks like healthy tissue or cancerous tissue. The main problem of this grading is the intra- or inter-observer variabilities.

BRIEF DESCRIPTION OF THE DRAWINGS

The accompanying drawings, which are incorporated in and constitute a part of the specification, illustrate various example operations, apparatus, methods, and other example embodiments of various aspects discussed herein. It will be appreciated that the illustrated element boundaries (e.g., boxes, groups of boxes, or other shapes) in the figures represent one example of the boundaries. One of ordinary skill in the art will appreciate that, in some examples, one element can be designed as multiple elements or that multiple elements can be designed as one element. In some examples, an element shown as an internal component of another element may be implemented as an external component and vice versa. Furthermore, elements may not be drawn to scale.

DETAILED DESCRIPTION

Figure 1:
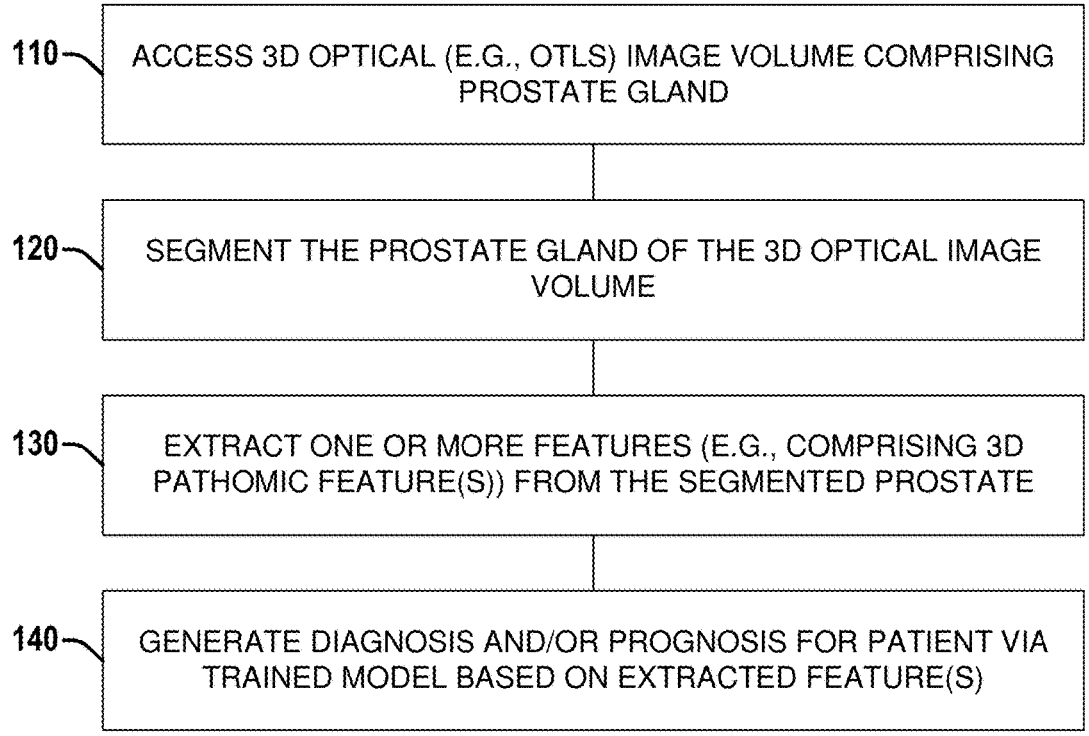
FIG. 1 illustrates a flow diagram of an example method/set of operations that can be performed by one or more processors to determine a diagnosis and/or prognosis for prostate cancer based at least in part on one or more 3D pathomic features, according to various aspects discussed herein.

Computational pathology has become popular to deal with the subjectivity problem of Gleason grading by extracting quantitative data from tissues or biopsies. The majority of computational pathology studies take 2D digital slides as input. However, they are limited to displaying thin slices of tissue in 2D as a result of the need for light permeation through relatively opaque tissue specimens. One potential solution for this is to stack multiple 2D slices in 3 dimensions. While several attempts have been made for volumetric imaging, such as 3D laser-scanning microscopy (e.g., confocal and multiphoton), and 3D image reconstruction of serially sectioned specimens, each approach has impediments to clinical adoption. These drawbacks include long image acquisition times, poor imaging depth, non-trivial 2D slice registration, and being too laborious for routine workflows. Early 3D light-sheet microscopes held promise in avoiding some of these constraints but were limited in terms of specimen size and shape.

The recent advent of open-top light sheet (OTLS) microscopy has sought to engineer light-sheet microscopy specifically for nondestructive 3D pathology of large clinical specimens. OTLS microscopy images an entire biopsy specimen nondestructively in 3D through acquiring many thin "optical sections," and does not require complex computational image registration following image collection. Recent studies have suggested that histomorphometric features extracted from 3D pathology may hold great promise for grading of disease aggressiveness, particularly for prostate cancer. For example, one group demonstrated anecdotally that inter-observer discordance of Gleason grades in difficult 3+3 and 3+4 cases could be reduced by examining an OTLS 3D representation of the biopsy. Accordingly, various embodiments can employ 3D analysis and quantification of biopsies to provide novel insights into cancer diagnosis and prognosis.

Various embodiments discussed herein can comprise techniques that can facilitate generating at least one of a diagnosis and/or prognosis for prostate cancer based on features determined from a 3D optical (e.g., OTLS) image volume of a prostate gland. Various techniques are discussed herein that can facilitate generation, along with example application of specific techniques in connection with a use case, although the specific techniques employed can vary, depending on the embodiment.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic or circuit, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Referring to FIG. 1, illustrated is a flow diagram of an example method/set of operations 100 that can be performed by one or more processors to determine a diagnosis and/or prognosis for prostate cancer based at least in part on one or more 3D pathomic features, according to various aspects discussed herein. Processor(s) can include any combination of general-purpose processors and dedicated processors (e.g., graphics processors, application processors, etc.). The one or more processors can be coupled with and/or can include memory or storage and can be configured to execute instructions stored in the memory or storage to enable various apparatus, applications, or operating systems to perform the operations. The memory or storage devices may include main memory, disk storage, or any suitable combination thereof. The memory or storage devices can comprise—but is not limited to—any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 100 can comprise, at 110, accessing a three-dimensional (3D) optical (e.g., OTLS) image volume of a prostate gland of a patient. In various embodiments and in the example use case discussed below, the image volume can be obtained via a system and/or apparatus implementing the set of operations 100, or can be obtained from a separate medical imaging system. Additionally, the image volume can be accessed contemporaneously with or at any point prior to performing the set of operations 100.

The set of operations 100 can further comprise, at 120, segmenting the prostate gland within the 3D optical image volume, according to techniques discussed herein. For example, segmenting the 3D optical image volume can comprise determining a boundary of the prostate gland, segmenting nuclei in the 3D optical image volume, and eliminating gland false positives, each of which can be according to techniques discussed herein.

The set of operations 100 can further comprise, at 130, calculating one or more features associated with the prostate gland. The one or more features can comprise one or more 3D pathomic features (e.g., volume, 3D surface curvature, other features discussed herein), one or more 2D pathomic features (e.g., area, 2D boundary curvature), etc.

The set of operations 100 can further comprise, at 140, generating a probability of prostate cancer recurrence-free survival based on the one or more extracted features via a trained model (e.g., a machine learning (ML) model such as a Linear Discriminant Analysis (LDA) classifier, a Quadratic Discriminant Analysis (QDA) classifier, a Support Vector Machine (SVM) classifier, or a Random Forest (RF) classifier, etc., another type of model, etc.).

Additionally or alternatively, set of operations 100 can comprise one or more other actions discussed herein in connection with determining a diagnosis and/or prognosis for prostate cancer based at least in part on one or more 3D pathomic features.

Figure 2:
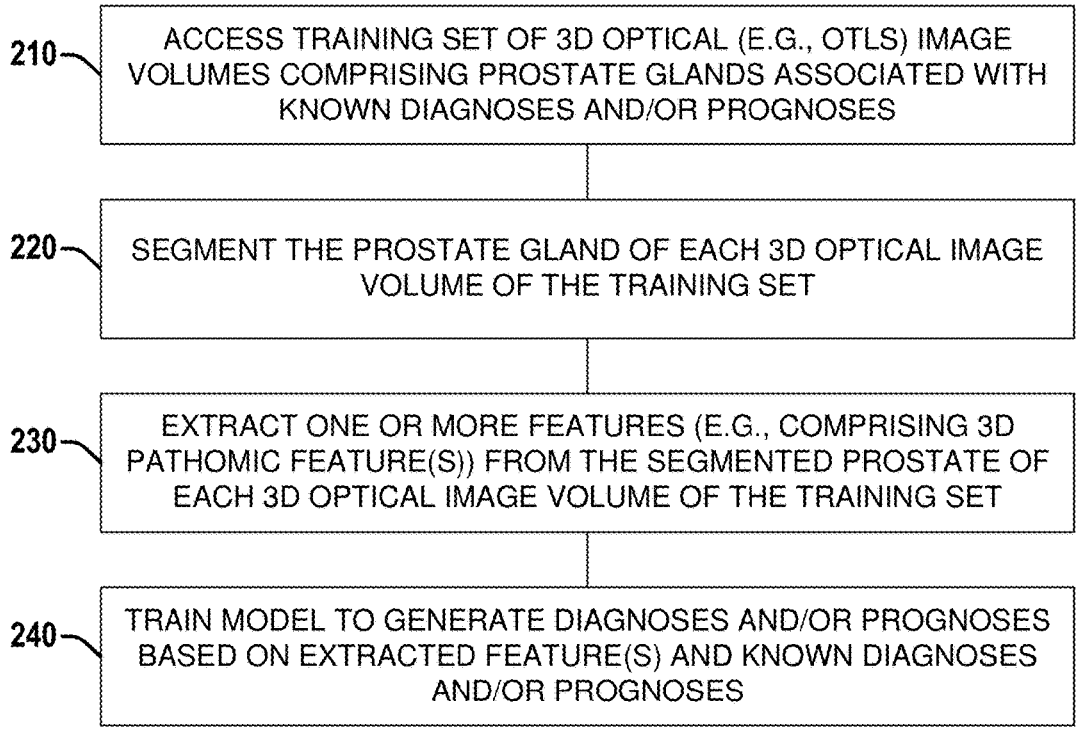
FIG. 2 illustrates a flow diagram of an example method/set of operations that can be performed by one or more processors to train a model to determine a diagnosis and/or prognosis for prostate cancer based at least in part on one or more 3D pathomic features, according to various aspects discussed herein.

Referring to FIG. 2, illustrated is a flow diagram of an example method/set of operations 200 that can be performed by one or more processors to train a model to determine a diagnosis and/or prognosis for prostate cancer based at least in part on one or more 3D pathomic features, according to various aspects discussed herein.

The set of operations 200 can comprise, at 210, accessing a training set of three-dimensional (3D) optical (e.g., OTLS) image volumes of prostate glands of patients, wherein each 3D optical image volume can be associated with at least one of a known diagnosis and/or a known prognosis. In various embodiments and in the example use case discussed below, the image volume can be obtained via a system and/or apparatus implementing the set of operations 200, or can be obtained from a separate medical imaging system. Additionally, the image volume can be accessed contemporaneously with or at any point prior to performing the set of operations 200.

The set of operations 200 can further comprise, at 220, for each 3D optical image volume of the training set, segmenting the prostate gland within that 3D optical image volume, according to techniques discussed herein. For example, segmenting the 3D optical image volume can comprise determining a boundary of the prostate gland, segmenting nuclei in the 3D optical image volume, and eliminating gland false positives, each of which can be according to techniques discussed herein.

The set of operations 200 can further comprise, at 230, for each 3D optical image volume of the training set, calculating one or more features associated with the prostate gland for that 3D optical image volume. The one or more features can comprise one or more 3D pathomic features (e.g., volume, 3D surface curvature, other features discussed herein), one or more 2D pathomic features (e.g., area, 2D boundary curvature), etc.

The set of operations 200 can further comprise, at 240, based on the calculated features and the known diagnoses and/or known prognoses, training a model (e.g., a machine learning (ML) model such as a Linear Discriminant Analysis (LDA) classifier, a Quadratic Discriminant Analysis (QDA) classifier, a Support Vector Machine (SVM) classifier, or a Random Forest (RF) classifier, etc., another type of model, etc.) to generate diagnoses and/or prognoses for prostate cancer based on values associated with the one or more features.

Additionally or alternatively, set of operations 200 can comprise one or more other actions discussed herein in connection with constructing a model to determine a diagnosis and/or prognosis for prostate cancer based on pathomic features extracted from a 3D optical (e.g., OTLS) image volume.

Additional aspects and embodiments are discussed below in connection with the following example use case.

Example Use Case: Three-Dimensional Histo-Morphometric Features from Light-Sheet Microscopy Images Result in Improved Discrimination of Benign from Malignant Glands in Prostate Cancer The following discussion provides example embodiments in connection with an example use case involving determination of 3D pathomic features of prostate glands and analysis of these features in differentiating between benign and malignant prostate glands.

A. Overview

Glandular features play an important role in the evaluation of prostate cancer. There has been significant interest in the use of 2D pathomics (feature extraction) approaches for detection, diagnosis, and characterization of prostate cancer on digitized tissue slide images. With the development of 3D microscopy techniques, such as open-top light-sheet (OTLS), there is an opportunity for rapid 3D imaging of large tissue specimens such as whole biopsies. The example use case investigated whether 3D features of gland morphology, namely volume and surface curvature, from OTLS images offer superior discrimination between malignant and benign glands compared to the traditional 2D gland features, namely area and curvature, alone. For the example use case, a cohort of 8 de-identified fresh prostate biopsies was comprehensively imaged in 3D via the OTLS platform. A total of 367 glands were segmented from these images, of which 79 were identified as benign and 288 were identified as malignant. Glands were segmented using a 3D watershed algorithm followed by post-processing steps to filter out false-positive regions. The 2D and 3D features were compared quantitatively and qualitatively. The experiments demonstrated that a model using 3D features outperformed one using 2D features in differentiating benign and malignant glands. In 3D, both features, gland volume ($p=1.45\times 10^{-3}$) and surface curvature ($p=3.2\times 10^{-3}$), were found to be informative whereas in 2D, only gland area ($p=9\times 10^{-18}$) was found to be discriminating ($p=0.79$ for 2D curvature). Based on the notable visual and quantitative differences between 3D benign/malignant glands, various embodiments can employ additional and/or alternative 3D features (e.g., including potentially more sophisticated features, for example, statistical features (e.g., mean, median, variance, standard deviation, skewness, kurtosis, etc.) derived from other 3D pathomic features, etc., texture features, deep learned features, etc.).

The example use case sought (1) to present new 3D computational pathology (or pathomic) features extracted from OTLS 3D representations of biopsies for the assessment of tumor morphology in a way that is not possible using 2D approaches, (2) to evaluate the ability of the 3D pathomic features to distinguish malignant from benign glands, and then (3) to investigate if making use of such 3D information (e.g., in combination with 2D information and/or alone) has advantages over using 2D information only. The example use case presents two new 3D pathomic features, light-sheet volume and surface curvature of glands, and extensively evaluated the ability of these two 3D pathomic features to discriminate benign and malignant glands. Additionally, the example use case also performed a head-to-head comparison against corresponding 2D pathomic features.

The remainder of the discussion of the example use case is organized as follows. Section B provides details of the OTLS dataset. The methodology is described in Section C and then the experimental results are discussed in Section D. Section E summarizes takeaways and other information about the example use case.

Figure 4:
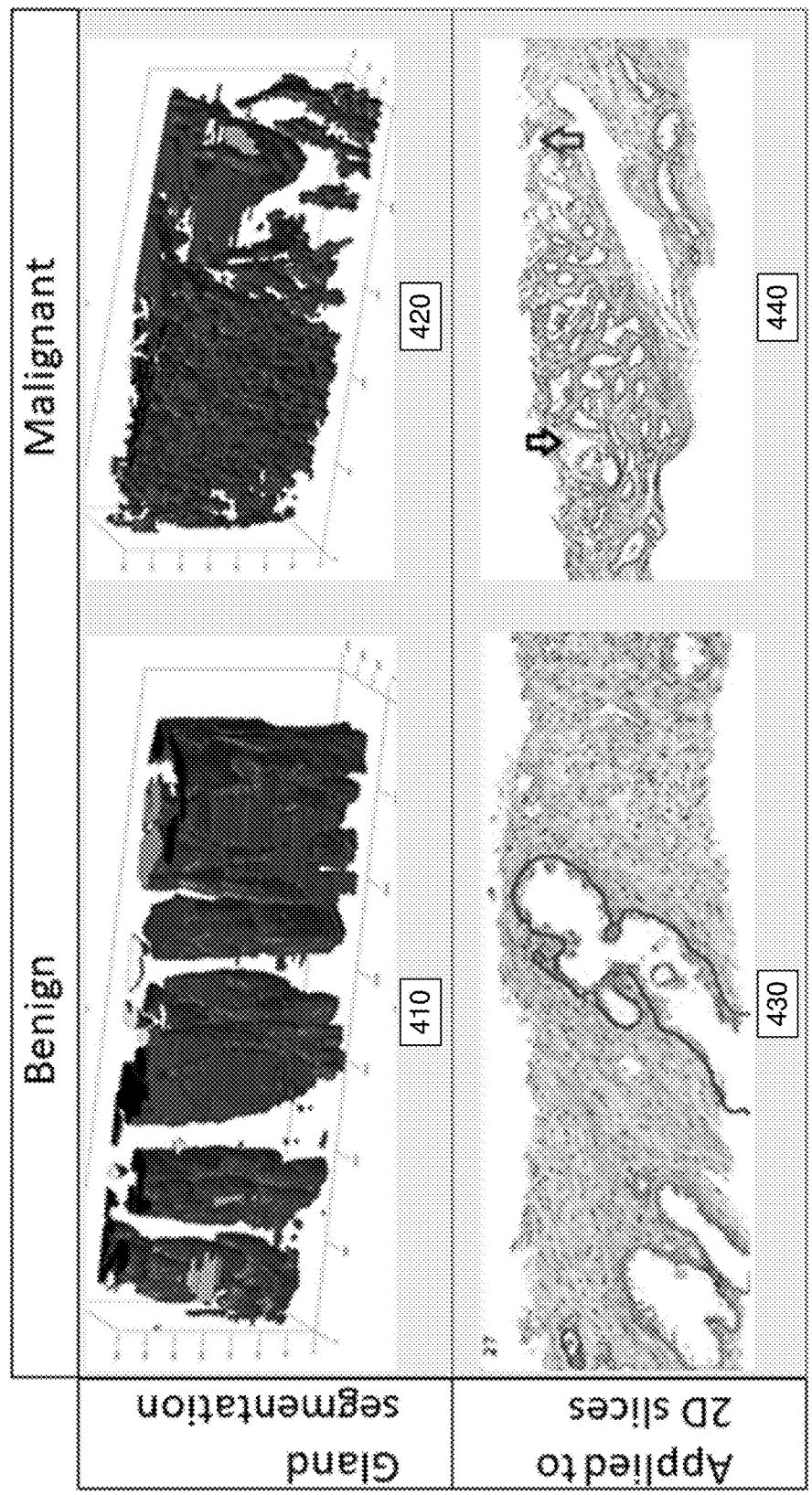
FIG. 4 illustrates example images of 3D segmentation results for benign and malignant glands and the segmentation results applied to 2D slices, in connection with various aspects discussed herein.

B. Dataset 3D pathology images were obtained from 8 de-identified fresh prostate biopsies using an OTLS microscope. The approximate sampling pitch of the OTLS system was 0.75 μm per pixel (spatial resolution ~1.5 μm), similar to a whole slide image scanned at ×20 magnification. Three-dimensional datasets were collected as two-channel 16-bit grayscale images for fluorescence signals generated by two small-molecular weight fluorophores, a cytoplasmic stain (eosin) and a nuclear stain (TO-PRO). In addition to the staining procedure, an optical-clearing protocol was used to make the tissues transparent to light that was a modified iDISCO protocol using ethyl cinnamate (ECi) as the final refractive-index-matching liquid. The fluorescence images were then recolored to mimic traditional hematoxylin-eosin (H & E) staining, as seen in FIG. 4 (discussed in greater detail below) at 430 and 440. Each biopsy produced 500 3-channel images of roughly 3000×45000 pixels, resulting in an average of 200 gigabytes of data per sample. A total of 367 glands were manually segmented and annotated by a board-certified genitourinary pathologist, of which 79 were labelled benign and 288 malignant. To compare the performance of 2D and 3D features, the same region of interest was used for generating both feature sets.

C. Methodology

Figure 3:
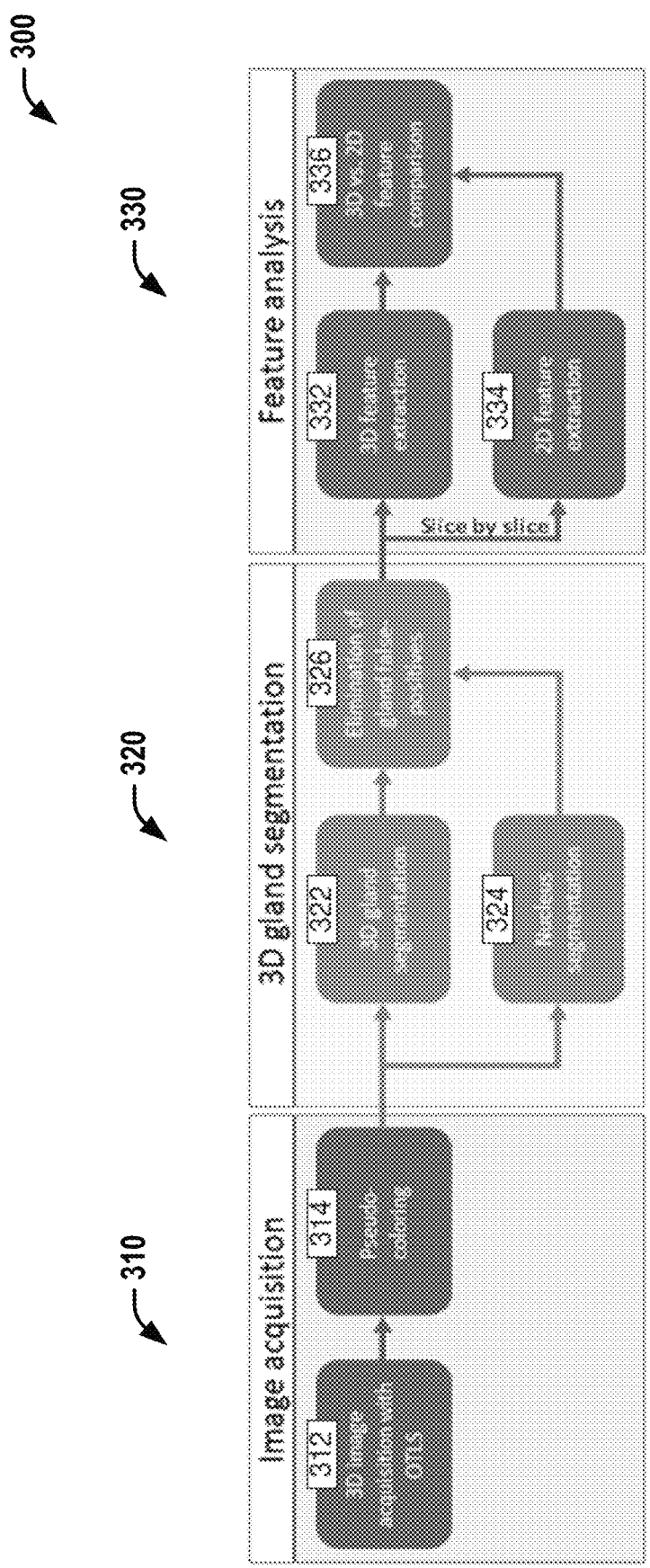
FIG. 3 illustrates a diagram showing the overall process flow for the example use case, according to various aspects discussed herein.

The overall framework of the example use case was two-fold. Referring to FIG. 3, illustrated is a diagram showing the overall process flow for the example use case, according to various aspects discussed herein. Following image acquisition using an OTLS microscope at 310 (e.g., including 312 and 314, discussed above), glands were segmented in 3D at 320 (e.g., including 322, 324, and 326, discussed below). After 3D gland segmentation, features were generated from the glands for downstream feature analysis at 330 (e.g., including 332, 334, and 336, discussed below).

3D Gland Segmentation

While some studies have focused on 2D segmentation of glands, the extension of 2D segmentations to the 3D space results in discontinuous segmented regions in the z-dimension, necessitating heavy post-processing. For the example use case, given the higher fidelity 3D representation of OTLS data, after separating hematoxylin and eosin channels of images, a 3D watershed segmentation algorithm was employed on eosin channels. The watershed segmentation algorithm identified a set of seed points, each of which corresponds to one object, and grew out from these seed points to delineate the boundaries of the objects. For the example use case, since lumen appears bright inside glands, seed points were defined as bright regions obtained after applying Otsu's thresholding to the grayscale volume. After 3D segmentation, nuclei were detected for every slice. The nucleus detection technique convolved the image with a bank of Laplacian of Gaussian filters with different scales to obtain a set of response maps. The local maxima of response maps were clustered into different groups by a mean-shift algorithm to select the final nucleus seeds. The seeds on every slice were then stacked up to eliminate the falsely segmented glands. Gland regions where at least half of the gland's boundary pixels were not within 10 µm of any segmented nuclei were removed. This approach eliminated spurious non-glandular regions such as background, artifacts, and periacinar retraction clefting. The remaining regions were designated as glands. Referring to FIG. 4, illustrated are examples of 3D segmentation results for benign and malignant glands (at 410 and 420) and the segmentation results applied to 2D slices (at 430 and 440), in connection with various aspects discussed herein. As can be seen at 410 and 420, the segmentation approach of the example use case resulted in smooth and continuous 3D subregions. In 430 and 440, glands that are connected in 3D space have the same shade outline. Additionally, in 440, examples of correctly identified background and periacinar retraction clefting are showing by the right and left arrows, respectively.

The segmentation and feature extraction methods were implemented in a combination of Python and C++, on a system with Intel Core i7-8700 (3.70 GHz) processor and 16 GB of RAM. The segmentation process took about 20 minutes on a region of interest (ROI) of ~3000×4000×500 voxels, resulting in an average of 10 gigabytes of ROI.

3D Pathomic Feature Extraction

Two 3D pathomic features were analyzed in the use case, gland volume and surface curvature. Previous studies have already shown that area of benign glands is much larger than area of malignant glands on 2D images. However, volume of glands has not been computationally analyzed previously. Gland volume was compared against benign and malignant glands to seek any discrimination between the groups. It was calculated as the number of voxels within a segmented gland.

Figure 5:
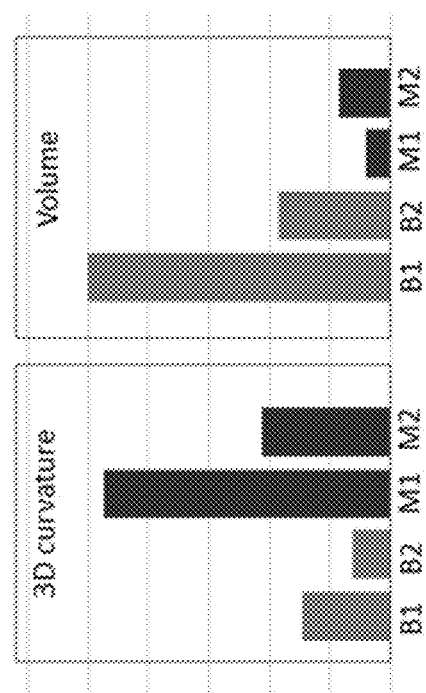
FIG. 5 illustrates diagrams showing a visual comparison of the 3D curvature of benign and malignant glands (left) along with bar plots of the 3D feature values from the example use case (right), in connection with various aspects discussed herein.
Figure 5:
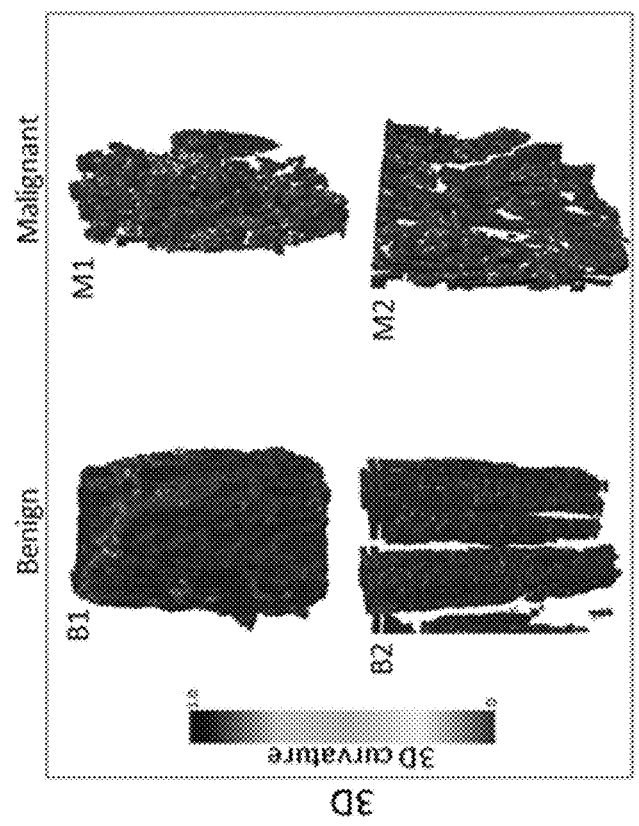
Figure 6:
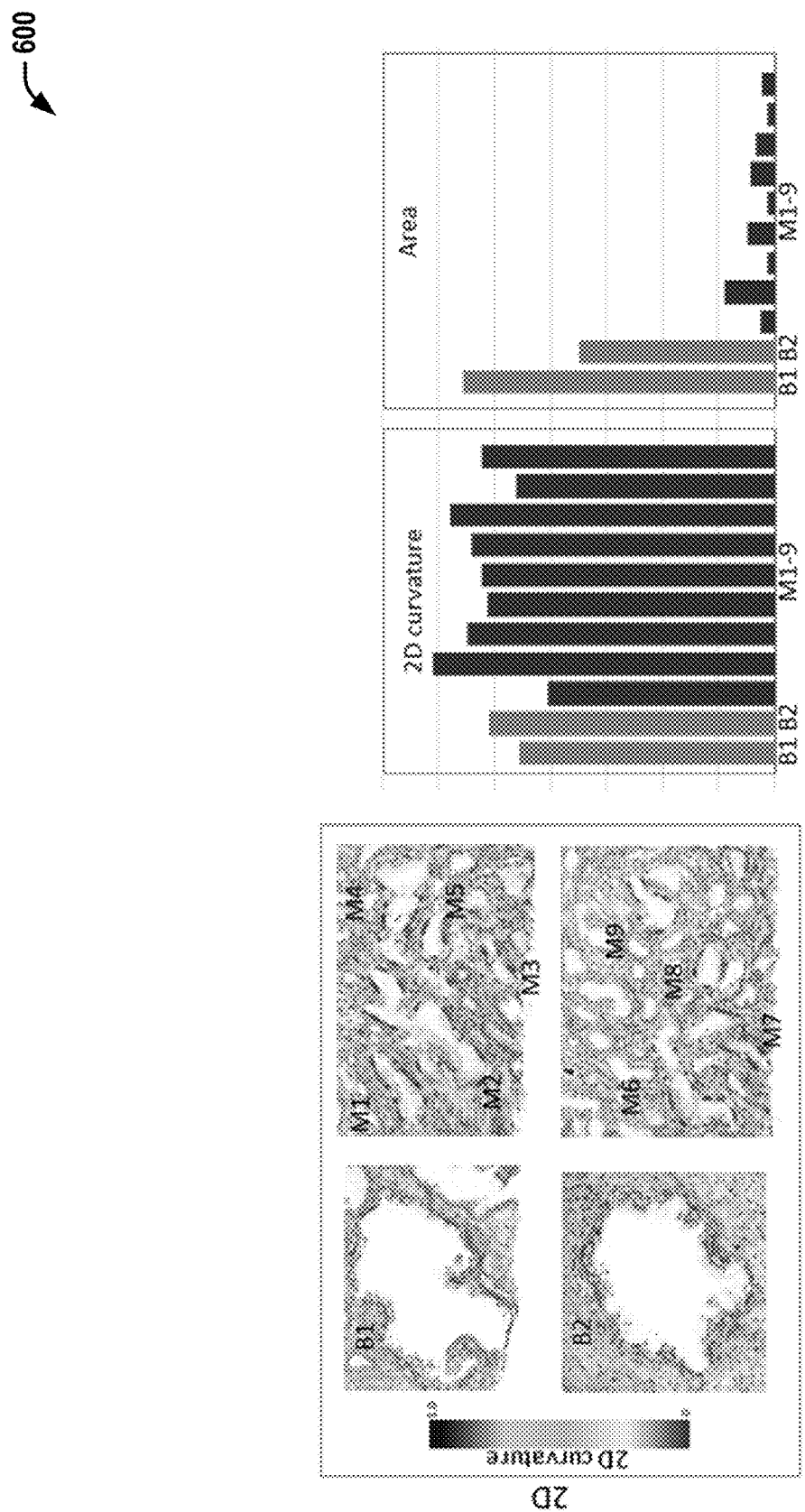
FIG. 6 illustrates diagrams showing a visual comparison of the 2D curvature of benign and malignant glands (left) along with bar plots of the 2D feature values from the example use case (right), in connection with various aspects discussed herein.

The 3D surface curvature of benign and malignant glands was also compared against each other. The rationale behind analyzing the surface curvature is that malignant glands appear morphologically different than benign ones because of their distorted surface and tubular structure. This morphological difference is a result of aggressiveness of the cancer. In malignant tissue, the glands are highly interconnected with each other. This densely connected network and irregular shape tend to produce surfaces with high curvature. On the other hand, benign tissue contains well-formed glands with a smoother surface, on which curvature will be closer to zero. To calculate 3D surface curvature, a polygonal mesh representing the gland surface was generated for each segmented gland using the marching cubes method. One advantage of representing glands with meshes is the speed-up in the feature extraction because it significantly decreases the number of points involved. Instead of billions of voxels, a limited number of triangles, each of which is represented by only three voxels, was taken into account. The Gaussian curvature values of the centroids of all faces on the mesh were then calculated. For the example use case, the Gaussian curvature value of a surface at point p was calculated as follows. Let $K_1$ and $K_2$ be the extreme values of curvature measured along two orthogonal curves through p. Then the Gaussian curvature value at point p is the product of the principal curvatures, $K_1 \cdot K_2$. Large positive or small negative values means that the surface near p is parabolic (positive) or hyperbolic (negative) whereas zero value means that the point p is planar on the surface (flat point). For each gland, the final curvature value was defined by averaging the absolute values of the curvatures of the surface points. Referring to FIG. 5, illustrated are diagrams showing a visual comparison of the 3D curvature of benign and malignant glands (left) along with bar plots of the 3D feature values from the example use case (right), in connection with various aspects discussed herein. Referring to FIG. 6, illustrated are diagrams showing a visual comparison of the 2D curvature of benign and malignant glands (left) along with bar plots of the 2D feature values from the example use case (right), in connection with various aspects discussed herein. In FIGS. 5-6, benign glands and malignant glands are denoted with B and M, respectively, and images have been cropped and resized for better visualization.

D. Experimental Design and Discussion

The example use case investigated computationally derived 3D gland features and compared them to their 2D counterparts in the context of distinguishing benign and malignant prostate glands. For quantitative comparison, the Mann-Whitney test was employed to evaluate the statistical significance of individual features between benign and malignant gland groups.

Analysis of the 3D Pathomic Features

Figure 7:
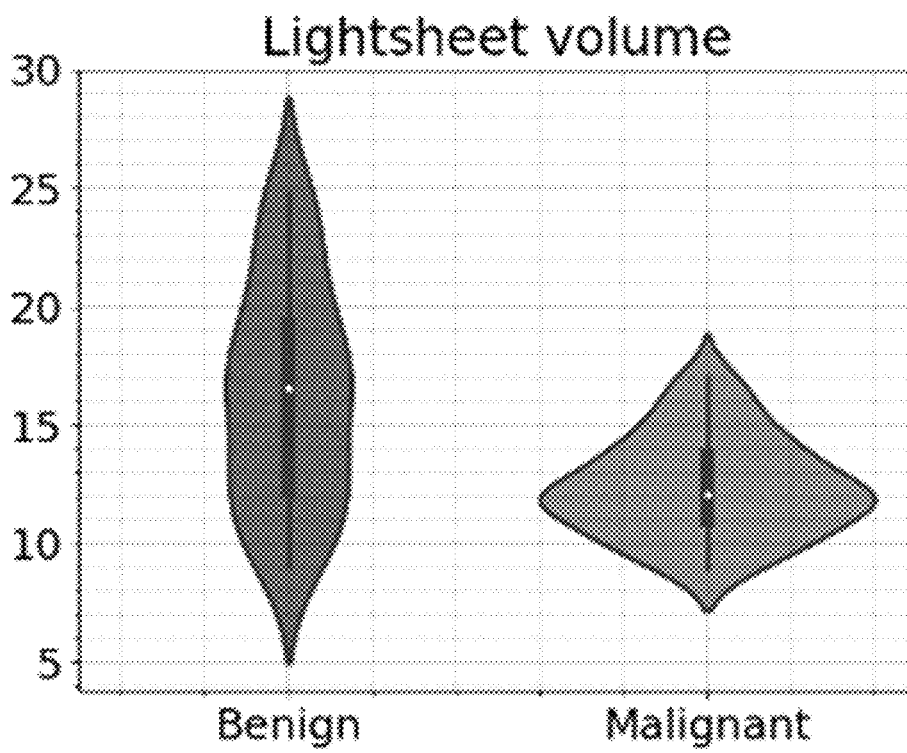
FIG. 7 illustrates a pair of plots showing distributions of volume and 3D surface curvature of segmented benign and malignant glands, in connection with various aspects discussed herein.
Figure 7:
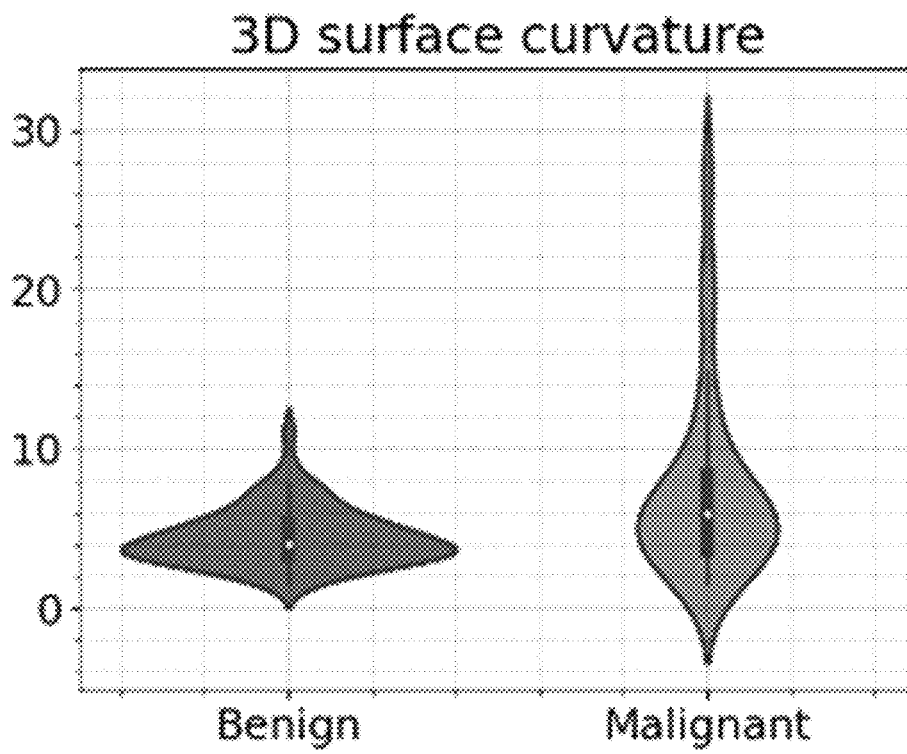
Figure 8:
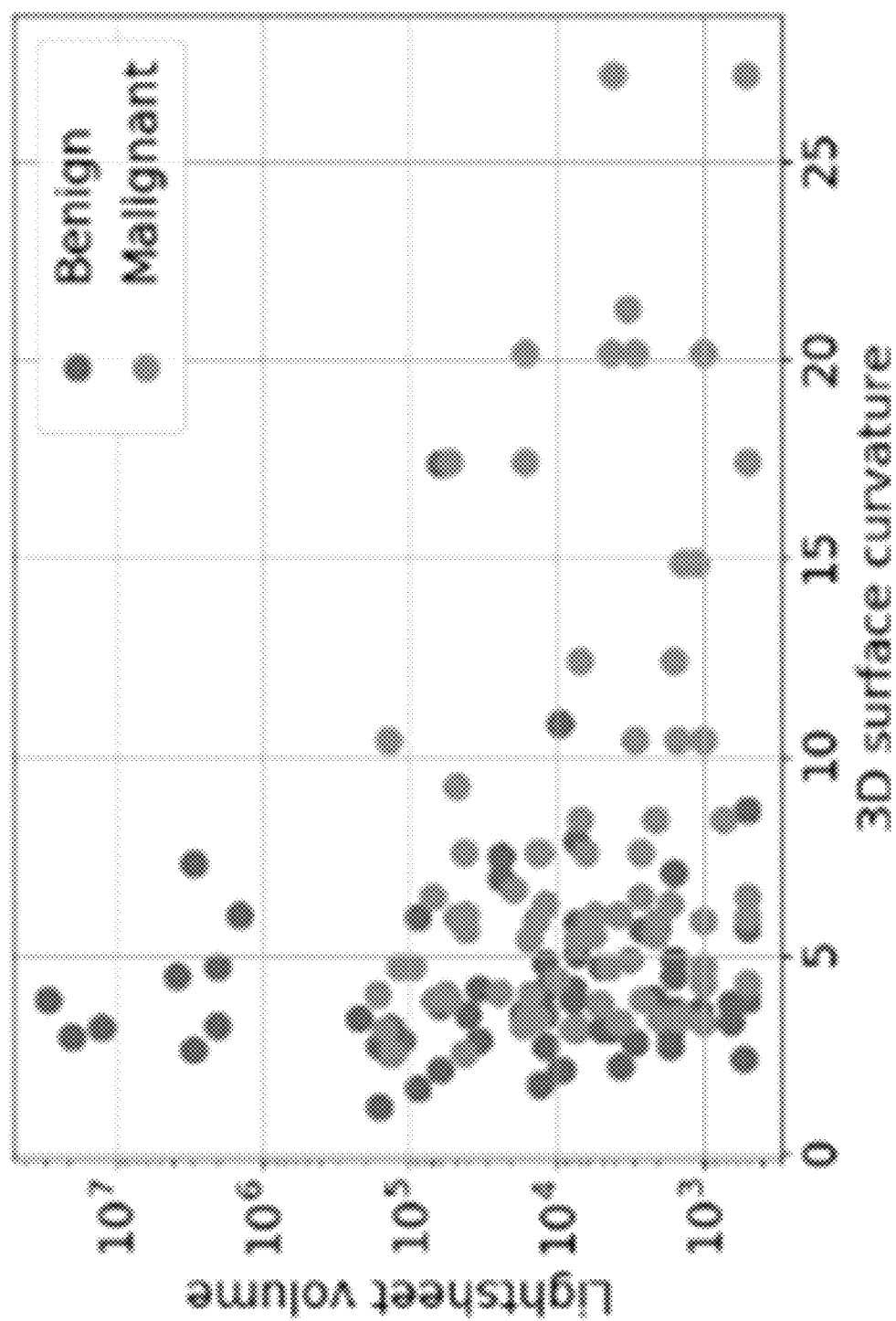
FIG. 8 illustrates a scatter distribution of benign and malignant gland samples along the volume and 3D surface curvature axes, in connection with various aspects discussed herein.

Referring to FIG. 7, illustrated is a pair of plots showing distributions of volume and 3D surface curvature of segmented benign and malignant glands, in connection with various aspects discussed herein. In 3D, gland volume and surface curvature were found to be discriminative in benign and malignant classification. 3D surface curvature produced a statistically significant class separation ($p=3.2\times10^{-3}$, bottom graph of FIG. 7). Likewise, 3D gland volume was also found to be statistically significant ($p=1.45\times10^{-3}$, top graph of FIG. 7). The volume renderings demonstrate that malignant glands contain a central tubule branching into small tubules, whereas such branching structure is not seen in benign glands (as seen in FIGS. 4-6). The 3D curvature value at branching points is large relative to other points on the gland surface, leading the malignant glands to have larger curvature values compared to the benign ones. Referring to FIG. 8, illustrated is a scatter distribution of benign and malignant gland samples along the volume and 3D surface curvature axes, in connection with various aspects discussed herein. FIG. 8 shows clear differences in both of the 3D features between benign and malignant glands.

Comparison of the 3D Pathomic Features with Their 2D Counterparts

Two features were extracted from the 2D segmentations: gland area and 2D curvature. Slices were used separately for 2D feature extraction, disregarding the z-dimension. 2D area was computed as the number of pixels in the segmented gland. 2D curvature was calculated on the boundary pixels of each segmented gland using a method wherein the 2D curvature of a pixel was defined as the inverse of the radius of a circle fitted to that pixel with respect to its immediate neighbors. The definitive curvature of a region was then defined as the mean of the curvature of all pixels on the boundary (as seen in FIG. 6).

Figure 9:
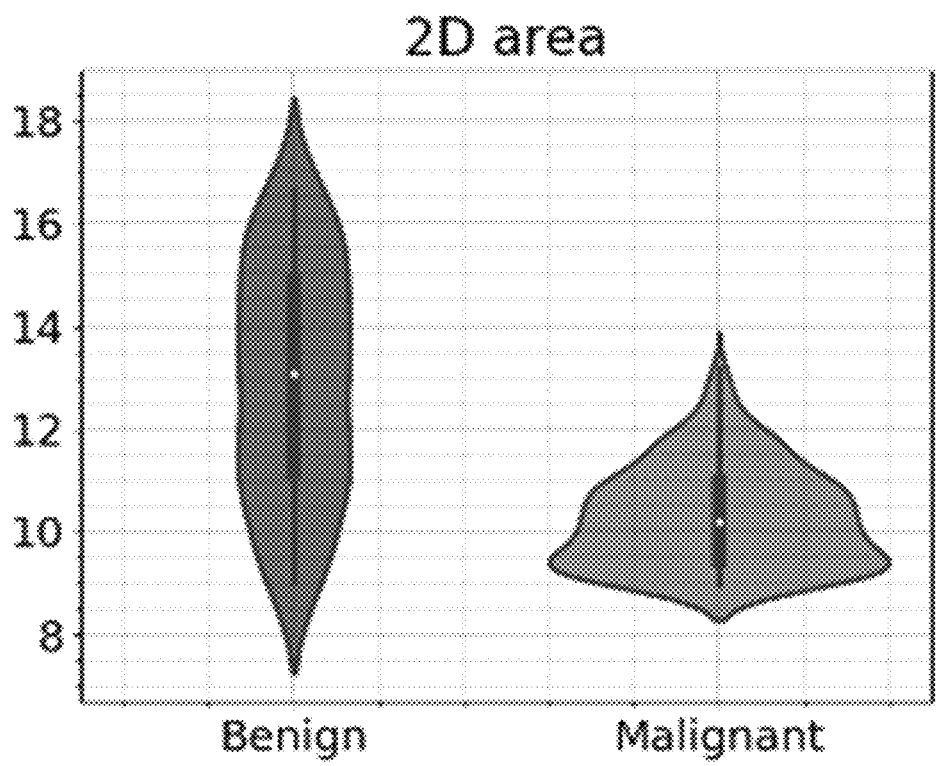
FIG. 9 illustrates a pair of plots showing distributions of 2D area and 2D boundary curvature of segmented benign and malignant glands, in connection with various aspects discussed herein.
Figure 9:
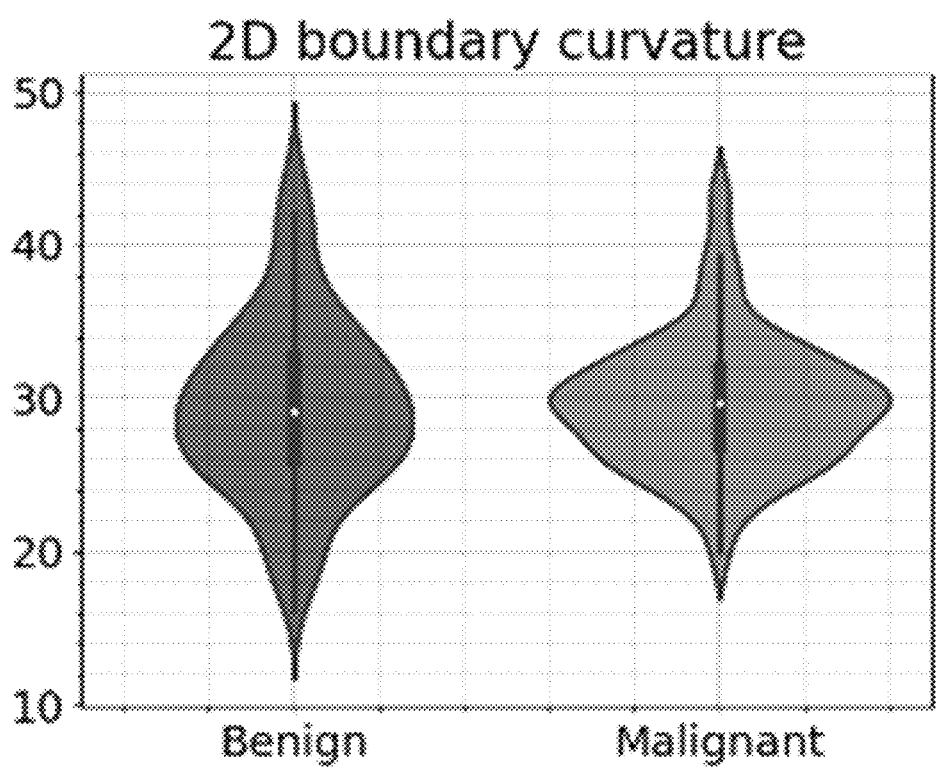
Figure 10:
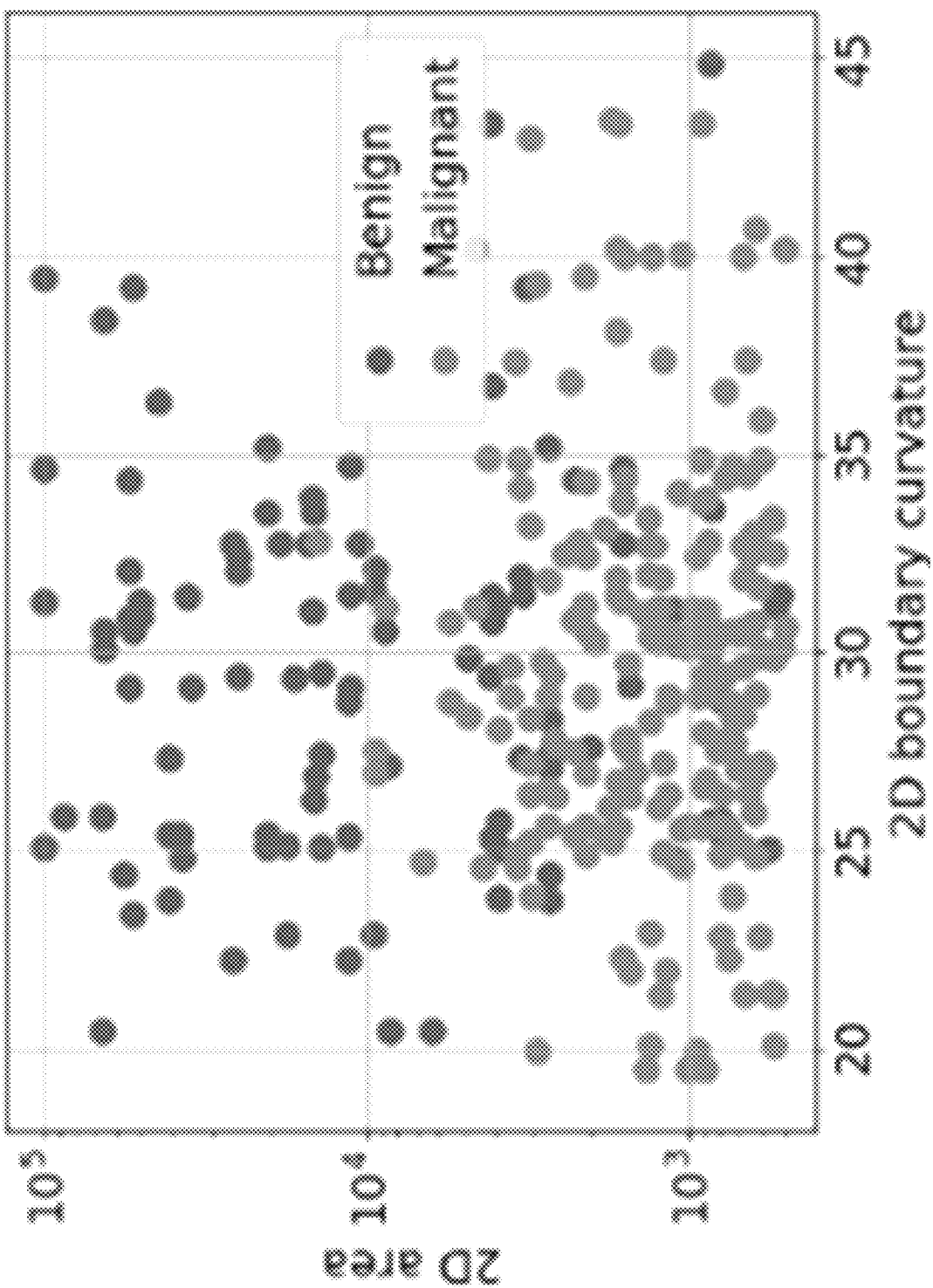
FIG. 10 illustrates a scatter distribution of benign and malignant gland samples along the area and 2D boundary curvature axes, in connection with various aspects discussed herein.

Referring to FIG. 9, illustrated is a pair of plots showing distributions of 2D area and 2D boundary curvature of segmented benign and malignant glands, in connection with various aspects discussed herein. Gland area was significantly different between benign and malignant glands ($p=9\times10^{-18}$, top graph of FIG. 9), a finding consistent with previous studies. One possible explanation for the significance of the area feature may be the representation of the single gland by multiple small glands in the 2D space because of the branching shape of the gland (as seen in FIGS. 4-6). Unlike cancerous glands, benign glands containing larger cylindrical lumens resulting in larger areas in 2D slices, implying that the 2D area feature is influenced by the shape of the glands, as opposed to solely their size. While the area feature was significant in this task, it may fail in distinguishing patterns such as Gleason 3+3 vs. 3+4, where the glandular area is not known to differentiate classes. 3D features may outperform 2D features in such a grading task where glands may have similar sizes but belong to different grades due to other properties of their shape. The 2D curvature feature did not result in a significant separation ($p=0.79$, bottom graph of FIG. 9). One potential reason behind the poor separation is that even if a malignant gland appears distorted (or irregular) in 3D, its 2D projections may contain smooth boundaries. As can be seen in FIG. 9, both benign and malignant glands contain a similar amount of large curvature points in 2D. Referring to FIG. 10, illustrated is a scatter distribution of benign and malignant gland samples along the area and 2D boundary curvature axes, in connection with various aspects discussed herein. FIG. 10 shows clear differences in the 2D gland area between benign and malignant glands, but not for 2D boundary curvature.

E. Conclusion

The example use case employed new 3D pathomic features extracted from OTLS 3D representations of prostate biopsies for the assessment of tumor morphology and investigated if such 3D information had advantages over using 2D information for the purpose of distinguishing benign from malignant glands. While the example use case employed a relatively small dataset size, in part due to the novel imaging modality (OTLS), computationally derived 3D gland features, namely light-sheet volume and surface curvature, were found to be discriminative whereas, among their 2D counterparts, the gland area was found to be informative. The results revealed that 3D features can be employed for classification and outcome prediction tasks. In addition to being quantitatively different in terms of feature values, the benign and malignant glands are qualitatively different when observed within 3D volumes. Various embodiments can employ 3D pathomic features (e.g., volume, surface curvature, etc.) for grading cancer aggressiveness and/or predicting disease outcome, alone or in conjunction with one or more 2D features (e.g., 2D gland area).

Additional Embodiments

In various example embodiments, method(s) discussed herein can be implemented as computer executable instructions. Thus, in various embodiments, a computer-readable storage device can store computer executable instructions that, when executed by a machine (e.g., computer, processor), cause the machine to perform methods or operations described or claimed herein including operation(s) described in connection with methods 100, 200, 300, or any other methods or operations described herein. While executable instructions associated with the listed methods are described as being stored on a computer-readable storage device, it is to be appreciated that executable instructions associated with other example methods or operations described or claimed herein can also be stored on a computer-readable storage device. In different embodiments, the example methods or operations described herein can be triggered in different ways. In one embodiment, a method or operation can be triggered manually by a user. In another example, a method or operation can be triggered automatically.

Embodiments discussed herein relate to training and/or employing models or classifiers to generate a diagnosis and/or prognosis for prostate cancer based at least in part on 3D pathomic features that are not perceivable by the human eye, and involve computation that cannot be practically performed in the human mind. As one example, machine learning and/or deep learning classifiers as described herein cannot be implemented in the human mind or with pencil and paper. Embodiments thus perform actions, steps, processes, or other actions that are not practically performed in the human mind, at least because they require a processor or circuitry to access digitized images stored in a computer memory and to extract or compute features that are based on the digitized images and not on properties of tissue or the images that are perceivable by the human eye. Embodiments described herein can use a combined order of specific rules, elements, operations, or components that render information into a specific format that can then be used and applied to create desired results more accurately, more consistently, and with greater reliability than existing approaches, thereby producing the technical effect of improving the performance of the machine, computer, or system with which embodiments are implemented.

Figure 11:
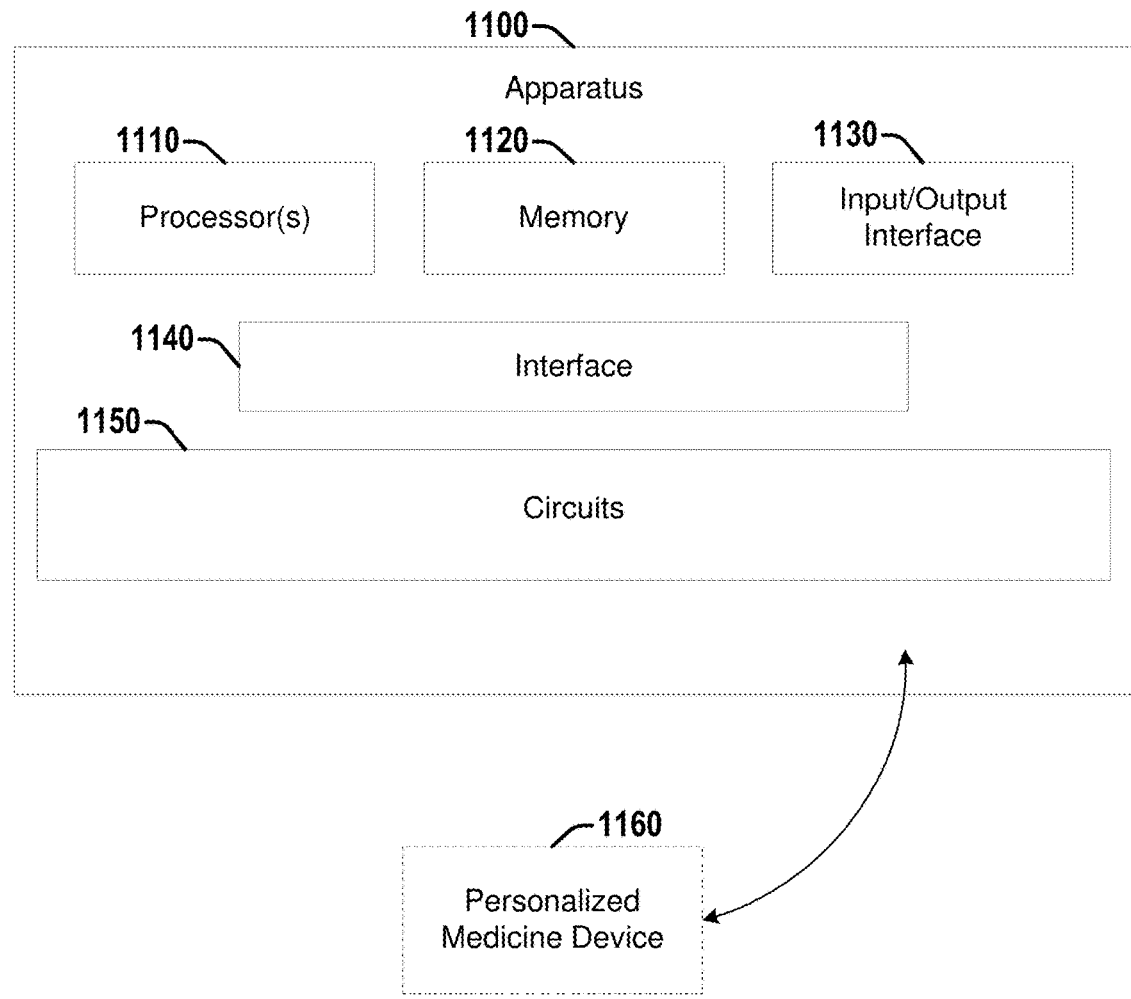
FIG. 11 illustrates a diagram of an example apparatus that can facilitate determination of a diagnosis (e.g., whether the prostate is benign or malignant and/or a Gleason score, etc.) of or prognosis for prostate cancer from a 3D optical image volume (e.g., obtained via OTLS microscopy) and/or training a machine learning (ML) classifier to perform such determination, according to various embodiments discussed herein.

Referring to FIG. 11, illustrated is a diagram of an example apparatus 1100 that can facilitate determination of a diagnosis (e.g., whether the prostate is benign or malignant and/or a Gleason score, etc.) of or prognosis for prostate cancer from a 3D optical image volume (e.g., obtained via OTLS microscopy) and/or training a machine learning (ML) classifier to perform such determination, according to various embodiments discussed herein. Apparatus 1100 can be configured to perform various techniques discussed herein, for example, various operations discussed in connection with sets of operations 100, 200, and/or 300. Apparatus 1100 can comprise one or more processors 1110 and memory 1120. Processor(s) 1110 can, in various embodiments, comprise circuitry such as, but not limited to, one or more single-core or multi-core processors. Processor(s) 1110 can include any combination of general-purpose processors and dedicated processors (e.g., graphics processors, application processors, etc.). The processor(s) can be coupled with and/or can comprise memory (e.g., of memory 1120) or storage and can be configured to execute instructions stored in the memory 1120 or storage to enable various apparatus, applications, or operating systems to perform operations and/or methods discussed herein. Memory 1120 can be configured to store one or more 3D optical image volumes (e.g., obtained via OTLS microscopy, etc.) of prostate cancer (e.g., for training, diagnosing, and/or prognosticating). Each of the image(s) can comprise a plurality of pixels or voxels, each pixel or voxel having an associated intensity. Memory 1120 can be further configured to store additional data involved in performing operations discussed herein, such as for determining a diagnosis and/or prognosis for prostate cancer from a 3D optical imaging volume and/or training a ML or DL model to generate a diagnosis and/or prognosis for prostate cancer from a 3D optical imaging volume, as discussed in greater detail herein.

Apparatus 1100 can also comprise an input/output (I/O) interface 1130 (e.g., associated with one or more I/O devices), a set of circuits 1150, and an interface 1140 that connects the processor(s) 1110, the memory 1120, the I/O interface 1130, and the set of circuits 1150. I/O interface 1130 can be configured to transfer data between memory 1120, processor 1110, circuits 1150, and external devices, for example, a medical imaging device (e.g., open-top light-sheet microscope, etc.), and/or one or more remote devices for receiving inputs and/or providing outputs to a clinician, patient, etc., such as optional personalized medicine device 1160.

The processor(s) 1110 and/or one or more circuits of the set of circuits 1150 can perform one or more acts associated with a method or set of operations discussed herein, such as set of operations 100, 200, and/or 300. In various embodiments, different acts (e.g., different operations of a set of operations) can be performed by the same or different processor(s) 1110 and/or one or more circuits of the set of circuits 1150.

Apparatus 1100 can optionally further comprise personalized medicine device 1160. Apparatus 1100 can be configured to provide the prostate cancer diagnosis (e.g., classification of the prostate gland as benign or malignant, Gleason score associated with the prostate gland, etc.) or prognosis for the patient, and/or other data to personalized medicine device 1160. Personalized medicine device 1160 may be, for example, a computer assisted diagnosis (CADx) system or other type of personalized medicine device that can be used to facilitate monitoring and/or treatment of an associated medical condition. In some embodiments, processor(s) 1110 and/or one or more circuits of the set of circuits 1150 can be further configured to control personalized medicine device 1160 to display the prostate cancer diagnosis and/or prognosis for the patient or other data on a computer monitor, a smartphone display, a tablet display, or other displays.

Examples herein can include subject matter such as an apparatus, an open-top light-sheet (OTLS) microscope, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for generating system-independent quantitative perfusion measurements, according to embodiments and examples described.

Example 1 is a non-transitory computer-readable medium storing computer-executable instructions that, when executed, cause a processor to perform operations, comprising: accessing a three-dimensional (3D) optical image volume comprising a prostate gland of a patient; segmenting the prostate gland of the 3D optical image volume; extracting one or more features from the segmented prostate gland, wherein the one or more features comprise at least one 3D pathomic feature; and generating, via a model based at least on the one or more features, one or more of the following based at least on the extracted one or more features: a classification of the prostate gland as one of benign or malignant, a Gleason score associated with the prostate gland, or a prognosis for the patient.

Example 2 comprises the subject matter of any variation of any of example(s) 1, wherein the 3D optical image volume is an open-top light-sheet (OTLS) microscopy image volume.

Example 3 comprises the subject matter of any variation of any of example(s) 1-2, wherein the 3D optical image volume has been recolored to mimic hematoxylin-eosin (H & E) staining.

Example 4 comprises the subject matter of any variation of any of example(s) 1-3, wherein segmenting the prostate gland comprises delineating the boundary of the prostate gland based at least in part on employing a 3D watershed segmentation algorithm to eosin channels.

Example 5 comprises the subject matter of any variation of any of example(s) 1-4, wherein segmenting the prostate gland comprises detecting nuclei for each slice of a plurality of slices of the 3D optical image volume and eliminating spurious non-glandular regions for each slice of the plurality of slices.

Example 6 comprises the subject matter of any variation of any of example(s) 5, wherein detecting nuclei for each slice of the plurality of slices of the 3D optical image volume comprises: convolving that slice with a bank of Laplacian of Gaussian filters with different scales to obtain a set of response maps; and clustering local maxima of the response maps of the set of response maps into groups via a mean-shift algorithm.

Example 7 comprises the subject matter of any variation of any of example(s) 1, wherein the at least one 3D pathomic feature comprises one or more of a volume of the prostate gland or a 3D surface curvature of the prostate gland.

Example 8 comprises the subject matter of any variation of any of example(s) 1, wherein the one or more features comprise a 2D gland area computed for each slice of a plurality of slices of the 3D optical image volume.

Example 9 comprises the subject matter of any variation of any of example(s) 1, wherein the model is one of a Linear Discriminant Analysis (LDA) classifier, a Quadratic Discriminant Analysis (QDA) classifier, a Support Vector Machine (SVM) classifier, or a Random Forest (RF) classifier.

Example 10 is a non-transitory computer-readable medium storing computer-executable instructions that, when executed, cause a processor to perform operations, comprising: accessing a training set comprising a plurality of three-dimensional (3D) optical image volumes, wherein each 3D optical image volume of the training set comprises an associated prostate gland of a patient associated with that 3D optical image volume, and wherein each 3D optical image volume is associated with clinical information comprising one or more of: an associated diagnosis as benign or malignant, an associated Gleason score, or an associated prognosis; for each 3D optical image volume of the training set: segmenting the associated prostate gland of that 3D optical image volume; and extracting, from the segmented associated prostate gland of that 3D optical image volume, an associated value for that 3D optical image volume for each feature of one or more features, wherein the one or more features comprise at least one 3D pathomic feature; and based at least on the associated values and the associated clinical information for the plurality of 3D optical image volumes of the training set, training a model to determine, based on associated values for the one or more features extracted from an additional 3D optical image volume of an additional prostate gland, one or more of: a classification of the additional prostate gland as one of benign or malignant, a Gleason score associated with the additional prostate gland, or a prognosis for a patient associated with the additional prostate gland.

Example 11 comprises the subject matter of any variation of any of example(s) 10, wherein each 3D optical image volume of the training set and the additional 3D optical image volume are open-top light-sheet (OTLS) microscopy image volume.

Example 12 comprises the subject matter of any variation of any of example(s) 10-11, wherein each 3D optical image volume of the training set and the additional 3D optical image volume have been recolored to mimic hematoxylin-eosin (H & E) staining.

Example 13 comprises the subject matter of any variation of any of example(s) 10-12, wherein, for each 3D optical image volume of the training set, segmenting the associated prostate gland of that 3D optical image volume comprises delineating the boundary of the associated prostate gland of that 3D optical image volume based at least in part on employing a 3D watershed segmentation algorithm to eosin channels.

Example 14 comprises the subject matter of any variation of any of example(s) 10-13, wherein for each 3D optical image volume of the training set, segmenting the associated prostate gland of that 3D optical image volume comprises detecting nuclei for each slice of a plurality of slices of that 3D optical image volume and eliminating spurious non-glandular regions for each slice of the plurality of slices of that 3D optical image volume.

Example 15 comprises the subject matter of any variation of any of example(s) 14, wherein detecting nuclei for each slice of the plurality of slices of that 3D optical image volume comprises: convolving that slice with a bank of Laplacian of Gaussian filters with different scales to obtain a set of response maps; and clustering local maxima of the response maps of the set of response maps into groups via a mean-shift algorithm.

Example 16 comprises the subject matter of any variation of any of example(s) 10-15, wherein the at least one 3D pathomic feature comprises one or more of a volume of the prostate gland or a 3D surface curvature of the prostate gland.

Example 17 comprises the subject matter of any variation of any of example(s) 10-16, wherein the one or more features comprise a 2D gland area computed for each slice of a plurality of slices of the 3D optical image volume.

Example 18 comprises the subject matter of any variation of any of example(s) 10-17, wherein the model is one of a Linear Discriminant Analysis (LDA) classifier, a Quadratic Discriminant Analysis (QDA) classifier, a Support Vector Machine (SVM) classifier, or a Random Forest (RF) classifier.

Example 19 is an apparatus, comprising: memory configured to store accessing a three-dimensional (3D) optical image volume comprising a prostate gland of a patient; one or more processors configured to: segment the prostate gland of the 3D optical image volume; extract one or more features from the segmented prostate gland, wherein the one or more features comprise at least one 3D pathomic feature; and generate, via a model based at least on the one or more features, one or more of the following based at least on the extracted one or more features: a classification of the prostate gland as one of benign or malignant, a Gleason score associated with the prostate gland, or a prognosis for the patient.

Example 20 comprises the subject matter of any variation of any of example(s) 19, wherein the 3D optical image volume is an open-top light-sheet (OTLS) microscopy image volume.

Example 21 comprises the subject matter of any variation of any of example(s) 19-20, wherein the 3D optical image volume has been recolored to mimic hematoxylin-eosin (H & E) staining.

Example 22 comprises the subject matter of any variation of any of example(s) 19-21, wherein segmenting the prostate gland comprises delineating the boundary of the prostate gland based at least in part on employing a 3D watershed segmentation algorithm to eosin channels.

Example 23 comprises the subject matter of any variation of any of example(s) 19-22, wherein segmenting the prostate gland comprises detecting nuclei for each slice of a plurality of slices of the 3D optical image volume and eliminating spurious non-glandular regions for each slice of the plurality of slices.

Example 24 comprises the subject matter of any variation of any of example(s) 23, wherein detecting nuclei for each slice of the plurality of slices of the 3D optical image volume comprises: convolving that slice with a bank of Laplacian of Gaussian filters with different scales to obtain a set of response maps; and clustering local maxima of the response maps of the set of response maps into groups via a mean-shift algorithm.

Example 25 comprises the subject matter of any variation of any of example(s) 19-24, wherein the at least one 3D pathomic feature comprises one or more of a volume of the prostate gland or a 3D surface curvature of the prostate gland.

Example 26 comprises the subject matter of any variation of any of example(s) 19-25, wherein the one or more features comprise a 2D gland area computed for each slice of a plurality of slices of the 3D optical image volume.

Example 27 comprises the subject matter of any variation of any of example(s) 19-26, wherein the model is one of a Linear Discriminant Analysis (LDA) classifier, a Quadratic Discriminant Analysis (QDA) classifier, a Support Vector Machine (SVM) classifier, or a Random Forest (RF) classifier.

Example 28 comprises an apparatus comprising means for executing any of the described operations of examples 1-27.

Example 29 comprises a machine readable medium that stores instructions for execution by a processor to perform any of the described operations of examples 1-27.

Example 30 comprises an apparatus comprising: a memory; and one or more processors configured to: perform any of the described operations of examples 1-27.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer-executable instructions that, when executed, cause a processor to perform operations, comprising:
   accessing a three-dimensional (3D) optical image volume comprising a prostate gland of a patient;
   segmenting the prostate gland of the 3D optical image volume, wherein during segmenting prostate gland nucleus seeds of a segment and their proximity to nucleus seeds of a different segment are interpreted to eliminate falsely segmented glands from the segmented prostate gland;
   extracting one or more features from the segmented prostate gland, wherein the one or more features comprise at least one 3D pathomic feature; and
   generating, via a model based at least on the one or more features, one or more of the following based at least on the extracted one or more features: a classification of the prostate gland as one of benign or malignant, a Gleason score associated with the prostate gland, or a prognosis for the patient.

2. The non-transitory computer-readable medium of claim 1, wherein the 3D optical image volume is an open-top light-sheet (OTLS) microscopy image volume.

3. The non-transitory computer-readable medium of claim 1, wherein the 3D optical image volume has been recolored to mimic hematoxylin-eosin (H & E) staining.

4. The non-transitory computer-readable medium of claim 1, wherein segmenting the prostate gland comprises delineating a boundary of the prostate gland based at least in part on employing a 3D watershed segmentation algorithm to eosin channels.

5. The non-transitory computer-readable medium of claim 1, wherein segmenting the prostate gland comprises detecting nuclei for each slice of a plurality of slices of the 3D optical image volume and eliminating spurious non-glandular regions for each slice of the plurality of slices by disregarding any detected glandular region where pixels comprising at least half of a boundary of the detected glandular region are greater than 10 um away from the nuclei of any of the plurality of slices.

6. The non-transitory computer-readable medium of claim 5, wherein detecting nuclei for each slice of the plurality of slices of the 3D optical image volume comprises:

convolving that slice with a bank of Laplacian of Gaussian filters with different scales to obtain a set of response maps; and clustering local maxima of response maps of the set of response maps into groups via a mean-shift algorithm.

7. The non-transitory computer-readable medium of claim 1, wherein the at least one 3D pathomic feature comprises a 3D surface curvature of the prostate gland, which is calculated from a polygonal mesh generated from the prostate gland using a marching cubes method.

8. The non-transitory computer-readable medium of claim 1, wherein the one or more features comprise a 2D gland area computed for each slice of a plurality of slices of the 3D optical image volume, and the at least one 3D pathomic feature comprises a 3D surface curvature of the prostate gland which is found by deriving a Gaussian curvature value by multiplying extreme values of curvature measured along two orthogonal curves through a first point on a surface of the 3D optical image volume, wherein a final value of the 3D surface curvature is an average of the absolute value of the Gaussian curvature values of points along the surface of the 3D optical image volume.

9. The non-transitory computer-readable medium of claim 1, wherein the model is one of a Linear Discriminant Analysis (LDA) classifier, a Quadratic Discriminant Analysis (QDA) classifier, a Support Vector Machine (SVM) classifier, or a Random Forest (RF) classifier.

10. A non-transitory computer-readable medium storing computer-executable instructions that, when executed, cause a processor to perform operations, comprising:
    accessing a training set comprising a plurality of three-dimensional (3D) optical image volumes, wherein each 3D optical image volume of the training set comprises an associated prostate gland of a patient associated with that 3D optical image volume, and wherein each 3D optical image volume is associated with clinical information comprising one or more of: an associated diagnosis as benign or malignant, an associated Gleason score, or an associated prognosis;
    for each 3D optical image volume of the training set:
        segmenting the associated prostate gland of that 3D optical image volume; and
        extracting, from the segmented associated prostate gland of that 3D optical image volume, an associated value for that 3D optical image volume for each feature of one or more features, wherein the one or more features comprise at least one 3D pathomic feature, and the at least one 3D pathomic feature comprises a 3D surface curvature of the associated prostate gland, which is calculated from a polygonal mesh generated from the associated prostate gland using a marching cubes method; and
    based at least on the associated values and the associated clinical information for the plurality of 3D optical image volumes of the training set, training a model to determine, based on associated values for the one or more features extracted from an additional 3D optical image volume of an additional prostate gland, one or more of: a classification of the additional prostate gland as one of benign or malignant, a Gleason score associated with the additional prostate gland, or a prognosis for a patient associated with the additional prostate gland.

11. The non-transitory computer-readable medium of claim 10, wherein each 3D optical image volume of the training set and the additional 3D optical image volume are open-top light-sheet (OTLS) microscopy image volume.

12. The non-transitory computer-readable medium of claim 10, wherein each 3D optical image volume of the training set and the additional 3D optical image volume have been recolored to mimic hematoxylin-eosin (H & E) staining.

13. The non-transitory computer-readable medium of claim 10, wherein, for each 3D optical image volume of the training set, segmenting the associated prostate gland of that 3D optical image volume comprises delineating a boundary of the associated prostate gland of that 3D optical image volume based at least in part on employing a 3D watershed segmentation algorithm to eosin channels which identifies a set of seed points, which are further interpreted to find final nucleus seeds, and wherein final nucleus seeds of a segment and their proximity to final nucleus seeds of a different segment are interpreted to eliminate falsely segmented glands.

14. The non-transitory computer-readable medium of claim 10, wherein for each 3D optical image volume of the training set, segmenting the associated prostate gland of that 3D optical image volume comprises detecting nuclei for each slice of a plurality of slices of that 3D optical image volume and eliminating spurious non-glandular regions for each slice of the plurality of slices of that 3D optical image volume by disregarding any detected glandular region where pixels comprising at least half of a boundary of the detected glandular region are greater than 10 um away from the nuclei of any of the plurality of slices.

15. The non-transitory computer-readable medium of claim 14, wherein detecting nuclei for each slice of the plurality of slices of that 3D optical image volume comprises:
    convolving that slice with a bank of Laplacian of Gaussian filters with different scales to obtain a set of response maps; and
    clustering local maxima of response maps of the set of response maps into groups via a mean-shift algorithm.

16. The non-transitory computer-readable medium of claim 10, wherein the at least one 3D pathomic feature further comprises an additional 3D surface curvature of the associated prostate gland which is found by deriving a Gaussian curvature value by multiplying extreme values of curvature measured along two orthogonal curves through a first point on a surface of the 3D optical image volume, wherein a final value of the additional 3D surface curvature is an average of the absolute value of the Gaussian curvature values of points along the surface of the 3D optical image volume.

17. The non-transitory computer-readable medium of claim 10, wherein the one or more features comprise a 2D gland area computed for each slice of a plurality of slices of the 3D optical image volume.

18. The non-transitory computer-readable medium of claim 10, wherein the model is one of a Linear Discriminant Analysis (LDA) classifier, a Quadratic Discriminant Analysis (QDA) classifier, a Support Vector Machine (SVM) classifier, or a Random Forest (RF) classifier.

19. An apparatus, comprising:
    memory configured to store accessing a three-dimensional (3D) optical image volume comprising a prostate gland of a patient;
    one or more processors configured to:
        segment the prostate gland of the 3D optical image volume;
        extract one or more features from the segmented prostate gland, wherein the one or more features comprise at least one 3D pathomic feature, and wherein the one or more features comprise a 3D surface curvature of the prostate gland, which is derived from extreme values of curvature measured along two orthogonal curves through a multitude of points on a surface of the 3D optical image volume; and generate, via a model based at least on the one or more features, one or more of the following based at least on the extracted one or more features: a classification of the prostate gland as one of benign or malignant, a Gleason score associated with the prostate gland, or a prognosis for the patient.

20. The apparatus of claim 19, wherein the 3D optical image volume has been recolored to mimic hematoxylin-eosin (H & E) staining.

21. The apparatus of claim 19, wherein segmenting the prostate gland comprises delineating a boundary of the prostate gland based at least in part on employing a 3D watershed segmentation algorithm to eosin channels which identifies a set of seed points, where final nucleus seeds are derived from these seed points, and wherein final nucleus seeds of a segment and their proximity to final nucleus seeds of a different segment are interpreted to eliminate falsely segmented glands.

22. The apparatus of claim 19, wherein segmenting the prostate gland comprises detecting nuclei for each slice of a plurality of slices of the 3D optical image volume and eliminating spurious non-glandular regions for each slice of the plurality of slices by disregarding any detected glandular region where pixels comprising at least half of a boundary of the detected glandular region are greater than 10 um away from the nuclei of any of the plurality of slices.

23. The apparatus of claim 22, wherein detecting nuclei for each slice of the plurality of slices of the 3D optical image volume comprises:

convolving that slice with a bank of Laplacian of Gaussian filters with different scales to obtain a set of response maps; and clustering local maxima of response maps of the set of response maps into groups via a mean-shift algorithm.

24. The apparatus of claim 19, wherein an additional 3D surface curvature of the prostate gland is calculated from a polygonal mesh generated from the prostate gland using a marching cubes method.

25. The apparatus of claim 19, wherein the one or more features further comprise a 2D gland area computed for each slice of a plurality of slices of the 3D optical image volume, and an additional 3D surface curvature of the prostate gland is derived from obtaining Gaussian curvature values by multiplying additional extreme values of curvature together for each of an additional multitude of points on an additional surface of the 3D optical image volume, wherein a final value of the additional 3D surface curvature is an average of the absolute value of the Gaussian curvature values.

26. The apparatus of claim 19, wherein the model is one of a Linear Discriminant Analysis (LDA) classifier, a Quadratic Discriminant Analysis (QDA) classifier, a Support Vector Machine (SVM) classifier, or a Random Forest (RF) classifier.

27. The apparatus of claim 19, wherein the optical image volume comprises images of the prostate gland taken using 3D microscopy.

* * * * *